United States Patent
Lee et al.

(10) Patent No.: US 11,585,910 B1
(45) Date of Patent: Feb. 21, 2023

(54) NON-UNIFORMITY CORRECTION OF PHOTODETECTOR ARRAYS

(71) Applicant: Allegro MicroSystems, LLC, Manchester, NH (US)

(72) Inventors: Adam Lee, Portland, OR (US); Andrew S. Huntington, Banks, OR (US); Charles Myers, Portland, OR (US); Shunming Sun, Colorado Springs, CO (US)

(73) Assignee: Allegro MicroSystems, LLC, Manchester, NH (US)

( * ) Notice: Subject to any disclaimer, the term of this patent is extended or adjusted under 35 U.S.C. 154(b) by 90 days.

(21) Appl. No.: 17/402,065

(22) Filed: Aug. 13, 2021

(51) Int. Cl.
| | |
|---|---|
| *G01S 7/48* | (2006.01) |
| *G01S 7/497* | (2006.01) |
| *G01S 17/894* | (2020.01) |
| *G01S 7/4863* | (2020.01) |

(52) U.S. Cl.
CPC ............ *G01S 7/497* (2013.01); *G01S 7/4863* (2013.01); *G01S 17/894* (2020.01)

(58) Field of Classification Search
CPC .......... G01S 17/00; G01S 17/42; G01S 17/04; G01S 17/06; G01S 7/49; G01S 17/88; H01L 31/02; H01L 31/00
USPC .......................................... 250/214 R, 214.1
See application file for complete search history.

(56) References Cited

U.S. PATENT DOCUMENTS

| | | | |
|---|---|---|---|
| 6,760,145 B1 | 7/2004 | Taylor et al. | |
| 6,778,728 B2 | 8/2004 | Taylor et al. | |
| 6,894,823 B2 | 5/2005 | Taylor et al. | |
| 6,989,921 B2 | 1/2006 | Bernstein et al. | |
| 7,015,780 B2 | 3/2006 | Bernstein et al. | |
| 7,160,753 B2 | 1/2007 | Williams, Jr. | |
| 7,432,537 B1 | 10/2008 | Huntington | |
| 7,504,053 B1 | 3/2009 | Alekel | |
| 7,764,719 B2 | 7/2010 | Munroe et al. | |
| 7,782,911 B2 | 8/2010 | Munroe et al. | |
| 7,852,549 B2 | 12/2010 | Alekel et al. | |
| 7,885,298 B2 | 2/2011 | Munroe | |
| 7,994,421 B2 | 8/2011 | Williams et al. | |
| 8,145,060 B2 * | 3/2012 | Hufstedler | H04B 10/6911 |
| | | | 398/139 |
| 8,207,484 B1 | 6/2012 | Williams | |
| 8,319,307 B1 | 11/2012 | Williams | |
| 8,570,372 B2 | 10/2013 | Russell | |
| 8,597,544 B2 | 12/2013 | Alekel | |
| 8,630,036 B2 | 1/2014 | Munroe | |

(Continued)

OTHER PUBLICATIONS

U.S. Appl. No. 17/352,829, filed Jun. 21, 2021, Huntington et al.

(Continued)

*Primary Examiner* — Que Tan Le

(74) *Attorney, Agent, or Firm* — Daly Crowley Mofford & Durkee, LLP

(57) ABSTRACT

Methods and apparatus for nonuniformity correction (NUC) for a sensor having an avalanche photodiode (APD) array and an integrated circuit. The sensor can include anode bias control module, a passive mode module, and an active mode module. DC photocurrent from the APD array can be measured and used for controlling an anode reverse bias voltage to each element in the APD to achieve a nonuniformity correction level less than a selected threshold.

29 Claims, 13 Drawing Sheets

(56) References Cited

U.S. PATENT DOCUMENTS

| | | |
|---|---|---|
| 8,630,320 B2 | 1/2014 | Munroe et al. |
| 8,730,564 B2 | 5/2014 | Alekel |
| 8,743,453 B2 | 6/2014 | Alekel et al. |
| 8,760,499 B2 | 6/2014 | Russell |
| 8,766,682 B2 | 7/2014 | Williams |
| 8,853,639 B2 | 10/2014 | Williams, Jr. |
| 9,121,762 B2 | 9/2015 | Williams et al. |
| 9,197,233 B2 | 11/2015 | Gaalema et al. |
| 9,269,845 B2 | 2/2016 | Williams et al. |
| 9,368,933 B1 | 6/2016 | Nijjar et al. |
| 9,397,469 B1 | 7/2016 | Nijjar et al. |
| 9,447,299 B2 | 9/2016 | Schut et al. |
| 9,451,554 B1 | 9/2016 | Singh et al. |
| 9,466,745 B2 | 10/2016 | Williams et al. |
| 9,553,216 B2 | 1/2017 | Williams et al. |
| 9,591,238 B2 | 3/2017 | Lee et al. |
| 9,693,035 B2 | 6/2017 | Williams et al. |
| 9,759,602 B2 | 9/2017 | Williams |
| 9,804,264 B2 | 10/2017 | Villeneuve et al. |
| 9,810,775 B1 | 11/2017 | Welford et al. |
| 9,810,777 B2 | 11/2017 | Williams et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,835,490 B2 | 12/2017 | Williams et al. |
| 9,841,495 B2 | 12/2017 | Campbell et al. |
| 9,843,157 B2 | 12/2017 | Williams |
| 9,847,441 B2 | 12/2017 | Huntington |
| 9,857,468 B1 | 1/2018 | Eichenholz et al. |
| 9,869,754 B1 | 1/2018 | Campbell et al. |
| 9,874,635 B1 | 1/2018 | Eichenholz et al. |
| 9,897,687 B1 | 2/2018 | Campbell et al. |
| 9,905,992 B1 | 2/2018 | Welford et al. |
| 9,923,331 B2 | 3/2018 | Williams |
| 9,941,433 B2 | 4/2018 | Williams et al. |
| 9,958,545 B2 | 5/2018 | Eichenholz et al. |
| 9,989,629 B1 | 6/2018 | LaChapelle |
| 9,995,622 B2 | 6/2018 | Williams |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,061,019 B1 | 8/2018 | Campbell et al. |
| 10,088,559 B1 | 10/2018 | Weed et al. |
| 10,094,925 B1 | 10/2018 | LaChapelle |
| 10,114,111 B2 | 10/2018 | Russell et al. |
| 10,121,813 B2 | 11/2018 | Eichenholz et al. |
| 10,132,879 B2 | 11/2018 | Latham et al. |
| 10,139,478 B2 | 11/2018 | Gaalema et al. |
| 10,169,678 B1 | 1/2019 | Sachdeva et al. |
| 10,169,680 B1 | 1/2019 | Sachdeva et al. |
| 10,175,345 B2 | 1/2019 | Rhee et al. |
| 10,175,697 B1 | 1/2019 | Sachdeva et al. |
| 10,191,155 B2 | 1/2019 | Curatu |
| 10,209,359 B2 | 2/2019 | Russell et al. |
| 10,211,592 B1 | 2/2019 | Villeneuve et al. |
| 10,211,593 B1 | 2/2019 | Lingvay et al. |
| 10,217,889 B2 | 2/2019 | Dhulla et al. |
| 10,218,144 B2 | 2/2019 | Munroe et al. |
| 10,241,198 B2 | 3/2019 | LaChapelle et al. |
| 10,254,388 B2 | 4/2019 | LaChapelle et al. |
| 10,254,762 B2 | 4/2019 | McWhirter et al. |
| 10,267,898 B2 | 4/2019 | Campbell et al. |
| 10,267,899 B2 | 4/2019 | Weed et al. |
| 10,267,918 B2 | 4/2019 | LaChapelle et al. |
| 10,275,689 B1 | 4/2019 | Sachdeva et al. |
| 10,295,668 B2 | 5/2019 | LaChapelle et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,338,199 B1 | 7/2019 | McWhirter et al. |
| 10,338,223 B1 | 7/2019 | Englard et al. |
| 10,340,651 B1 | 7/2019 | Drummer et al. |
| 10,345,437 B1 | 7/2019 | Russell et al. |
| 10,345,447 B1 | 7/2019 | Hicks |
| 10,348,051 B1 | 7/2019 | Shah et al. |
| 10,386,489 B2 | 8/2019 | Albelo et al. |
| 10,394,243 B1 | 8/2019 | Ramezani et al. |
| 10,401,480 B1 | 9/2019 | Gaalema et al. |
| 10,401,481 B2 | 9/2019 | Campbell et al. |
| 10,418,776 B2 | 9/2019 | Welford et al. |
| 10,445,599 B1 | 10/2019 | Hicks |
| 10,451,716 B2 | 10/2019 | Hughes et al. |
| 10,473,788 B2 | 11/2019 | Englard et al. |
| 10,481,605 B1 | 11/2019 | Maila et al. |
| 10,488,496 B2 | 11/2019 | Campbell et al. |
| 10,491,885 B1 | 11/2019 | Hicks |
| 10,502,831 B2 | 12/2019 | Eichenholz |
| 10,503,172 B2 | 12/2019 | Englard et al. |
| 10,509,127 B2 | 12/2019 | Englard et al. |
| 10,514,462 B2 | 12/2019 | Englard et al. |
| 10,520,602 B2 | 12/2019 | Villeneuve et al. |
| 10,523,884 B2 | 12/2019 | Lee et al. |
| 10,535,191 B2 | 1/2020 | Sachdeva et al. |
| 10,539,665 B1 | 1/2020 | Danziger et al. |
| 10,545,240 B2 | 1/2020 | Campbell et al. |
| 10,551,485 B1 | 2/2020 | Maheshwari et al. |
| 10,551,501 B1 | 2/2020 | LaChapelle |
| 10,557,939 B2 | 2/2020 | Campbell et al. |
| 10,557,940 B2 | 2/2020 | Eichenholz et al. |
| 10,571,567 B2 | 2/2020 | Campbell et al. |
| 10,571,570 B1 | 2/2020 | Paulsen et al. |
| 10,578,720 B2 | 3/2020 | Hughes et al. |
| 10,591,600 B2 | 3/2020 | Villeneuve et al. |
| 10,591,601 B2 | 3/2020 | Hicks et al. |
| 10,606,270 B2 | 3/2020 | Englard et al. |
| 10,627,495 B2 | 4/2020 | Gaalema et al. |
| 10,627,512 B1 | 4/2020 | Hicks |
| 10,627,516 B2 | 4/2020 | Eichenholz |
| 10,627,521 B2 | 4/2020 | Englard et al. |
| 10,636,285 B2 | 4/2020 | Haas et al. |
| 10,641,874 B2 | 5/2020 | Campbell et al. |
| 10,663,564 B2 | 5/2020 | LaChapelle |
| 10,663,585 B2 | 5/2020 | McWhirter |
| 10,677,897 B2 | 6/2020 | LaChapelle et al. |
| 10,677,900 B2 | 6/2020 | Russell et al. |
| 10,684,360 B2 | 6/2020 | Campbell |
| 10,908,232 B2 | 2/2021 | Latham et al. |
| 2018/0069367 A1 | 3/2018 | Villeneuve et al. |
| 2018/0284239 A1 | 10/2018 | LaChapelle et al. |
| 2018/0284240 A1 | 10/2018 | LaChapelle et al. |
| 2018/0284275 A1 | 10/2018 | LaChapelle |
| 2018/0284280 A1 | 10/2018 | Eichenholz et al. |
| 2019/0310368 A1 | 10/2019 | LaChapelle |

OTHER PUBLICATIONS

U.S. Appl. No. 17/352,937, filed Jun. 21, 2021, Cadugan et al.
U.S. Appl. No. 17/376,607, filed Jul. 15, 2021, Stewart et al.
U.S. Appl. No. 17/400,300, filed Aug. 12, 2021, Myers et al.
U.S. Appl. No. 17/197,314, filed Mar. 10, 2021, Taylor et al.
U.S. Appl. No. 17/197,328, filed Mar. 30, 2021, Taylor et al.
U.S. Appl. No. 17/230,253, filed Apr. 14, 2021, Judkins, III et al.
U.S. Appl. No. 17/230,276, filed Apr. 14, 2021, Cadugan.
U.S. Appl. No. 17/230,277, filed Apr. 14, 2021, Judkins, III et al.
TW201422772 (w/Machine English Translation from Espacenet.com) 70 Pages, Jun. 16, 2014, Schut et al.

\* cited by examiner

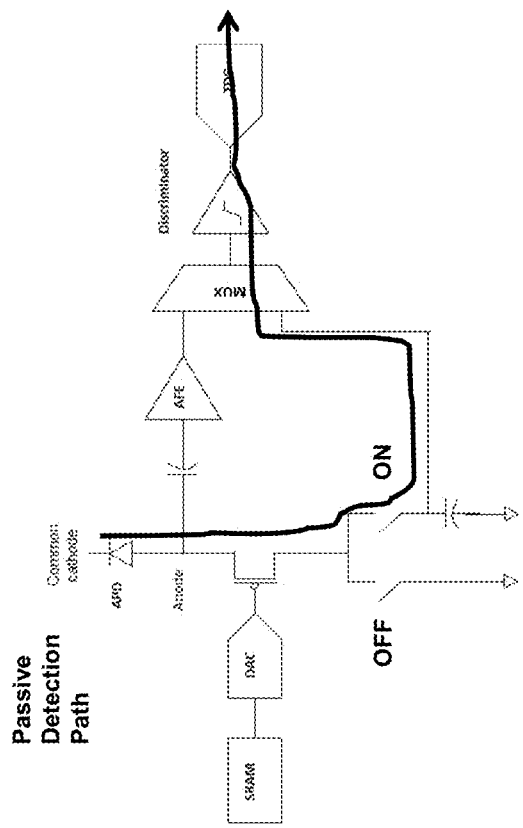
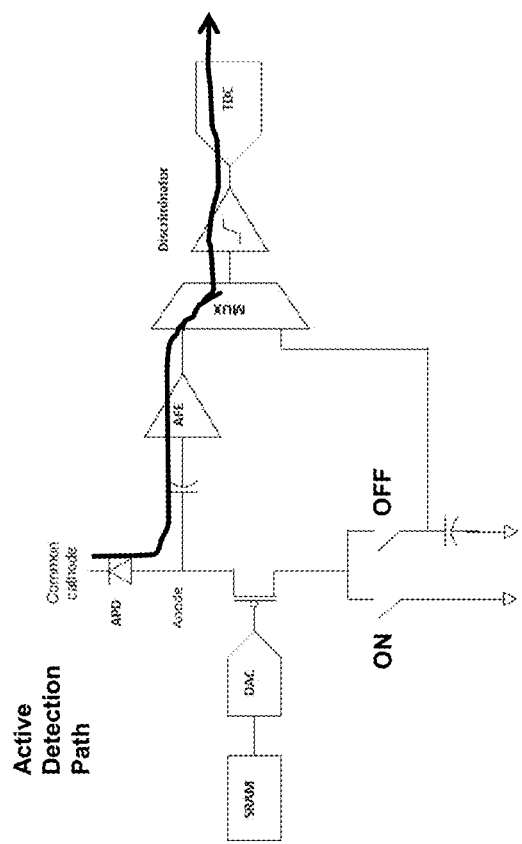
FIG. 9B
FIG. 9A

NON-UNIFORMITY CORRECTION OF PHOTODETECTOR ARRAYS

BACKGROUND

As is known in the art, some known ranging systems can include laser radar (ladar), light-detection and ranging (lidar), and range-finding systems, to measure the distance to objects in a scene. A laser ranging and imaging system emits pulses toward a particular location and measures the return echoes to extract ranges to objects at the location, from which a three-dimensional representation of the objects can be computed.

Time-of-flight laser ranging systems generally work by emitting a laser pulse and recording the time it takes for the laser pulse to travel to a target, reflect, and return to a photoreceiver. The laser ranging instrument records the time of the outgoing pulse and records the time that a laser pulse returns. The difference between these two times is the time of flight to and from the target. Using the speed of light, the round-trip time of the pulses is used to calculate the distance to the target.

Photodetector arrays, such as a focal plane array (FPA), can be used to detect signal returns. Multi-pixel time-of-flight (ToF) receivers having linear mode avalanche photodiode (APD) sensing elements in the FPA often suffer from gain mismatch across the photodiode array despite all elements operating under identical reverse bias. This mismatch may result from APD manufacturing process variations which cannot easily be reduced below the level of practical impact. As a result of APD gain mismatch, conventional APD-based multi-pixel ToF receivers may suffer from variation in optical sensitivity across the pixels of the array.

SUMMARY

Example embodiments of the disclosure provide methods and apparatus for non-uniformity correction (NUC) that can be used to equalize the gain of the APD elements across an array for improving uniformity of sensitivity across the receiver. Example embodiments of a ToF receiver having NUC may include a secondary mode of operation in which the receiver can operate in a passive mode where pixels of the receiver are not measuring the timing and amplitude of optical return pulses. Instead, the receiver measures the direct current (DC) photocurrent in the individual APD elements of the array.

A passive module may implement a passive mode of operation in a variety of ways. In one embodiment, passive mode can include integration of APD photocurrent over a defined time period. In another embodiment, passive mode can include measuring the amplified APD current using a current/voltage (I/V) converter, such as a transimpedance amplifier (TIA) for example. In a further embodiment, passive mode can include passive measurement circuits to produce a potential (or digitized potential) that is representative of the APD DC current and/or a time measurement that is representative of the APD DC current.

Sensor embodiments may include biasing for avalanche photodiodes (APDs) based on a direct injection (DI) structure that supports one or more features. In embodiments, a sensor includes individual pixelated control of the APD anode for controlling photodiode reverse biasing using a DI transistor, e.g., PFET, a digital-to-analog converter (DAC), and/or SRAM. High output impedance of the DI PFET device at high frequencies results in good charge injection to the active detection path for transient signals and desired attenuation of low frequency signals. An integrated passive mode can be used for passive imaging and/or for gain non-uniformity correction (NUC) of the APD. In embodiments, passive mode operation is based on a direct injection (DI) integration. An integrated voltage may be passed to a discriminator and time-to-digital converter (TDC) to generate time-to-threshold timing information. In some embodiments, instead of DI based biasing, buffered direct injection (BDI) structure is used that can improve regulation of APD anode potential. In other embodiments, the passive mode is accomplished with an instantaneous measurement of the background current generated in the APD.

In one aspect, a method comprises: for a sensor having an avalanche photodiode (APD) array and an integrated circuit having a bias control module and a passive/active mode module; measuring currents from the APD array; individually controlling reverse bias voltages applied across each element in the APD array to reduce response nonuniformity among the elements of the APD array; and selecting a nonuniformity bias correction for each element based on the measured currents from the APD array.

A method can further include one or more of the following features in any combination: integrating the currents from the APD array for one or more defined amounts of time, converting currents from the APD array to voltage levels, the APD array has a common cathode configuration, the APD array has a common anode configuration, illuminating the APD array with a first light level L1 and a second light level L2, illuminating the APD array at the first and second light levels L1 and L2 with a continuous wave (CW) light source, one of first and second light levels L1 or L2 is the non-illuminated dark condition, performing a current measurement I(V1,L1) at a first APD bias condition V1 and the first light level L1, for each element in the APD array, determining each element's total current, which comprises the sum of each element's photocurrent and dark current in that condition, performing a current measurement I(V1,L2) at a first APD bias condition V1 and the second light level L2, for each element in the APD array, determining each element's total current, which comprises the sum of each element's photocurrent and dark current in that condition, performing a current measurement I(V2,L1) at a second APD bias condition V2 and the first light level L1, for each element in the APD array, determining each element's total current, which comprises the sum of each element's photocurrent and dark current in that condition, performing a current measurement I(V2,L2) at a second APD bias condition V2 and the second light level L2, for each element in the APD array, determining each element's total current, which comprises the sum of each element's photocurrent and dark current in that condition, determining a relative gain of each element in the APD array in the two bias conditions, V1 and V2, from the four current measurements I(V1,L1), I(V1,L2), I(V2,L1), and I(V2,L2), determining the gain of each element of the APD array at bias condition V2 relative to its gain at bias condition V1 as: $Abs[I(V2,L1)-I(V2,L2)]/Abs[I(V1,L1)-I(V1,L2)]$, where $Abs[x]$ represents the absolute value of quantity x, and using the relative gains computed for each element of the APD array to control the reverse bias voltages applied across each element to reduce the response nonuniformity among the elements of the APD array, the bias control module comprises a memory, a digital-to-analog converter (DAC), and a transistor, which is coupled to a first one of the elements in the APD array, the passive/active mode module comprises an active/passive switch and an integration capacitor, wherein the first one of the elements in the APD array, the transistor, the active/passive switch, and the integration capacitor provide a direct injection integrator mode for the sensor in active mode, the sensor comprises a time-to-digital converter (TDC) for generating time-stamp when a voltage level on the integration capacitor exceeds a threshold, performing a plurality of total current measurements I(V1,L1), I(V2,L1), I(V3,L1), etc., at a plurality of APD bias conditions and at the first light level L1, for each element in the APD array, and determining each element's total current, which comprises the sum of each element's photocurrent and dark current in that condition, performing a plurality of total current measurements I(V1,L2), I(V2,L2), I(V3,L2), at a plurality of APD bias conditions V1, V2, V3, and at the second light level L2, for each element in the APD array, and determining each element's total current, which comprises the sum of each element's photocurrent and dark current in that condition, determining the gains of each element of the APD array at the plurality of bias conditions V2, V3 relative to its gain at bias condition V1, as: Abs[I(V,L1)–I(V,L2)]/Abs[I(V1,L1)–I(V1,L2)], where V represents one of the plurality of APD bias conditions V2, V3 and Abs[x] represents the absolute value of quantity x, and using the relative gains computed for each element of the APD array to control the reverse bias voltages applied across each element of the APD array to reduce the response nonuniformity among the elements of the APD array, the nonuniformity correction of the reverse bias voltages applied across each element of the APD array are found by selecting from the plurality of bias conditions tested, V2, V3, the bias condition for each element resulting in the relative gain closest to some specified value, the nonuniformity correction of the reverse bias voltages applied across each element of the APD array are found by selecting from the plurality of bias conditions tested, V2, V3, the two bias conditions for each element resulting in relative gains closest to some specified value, and estimation of the reverse bias that will result in the specified value of relative gain by linear interpolation, the nonuniformity correction of the reverse bias voltages applied across each element of the APD array are found by fitting the plurality of relative gain values calculated for the plurality of bias conditions tested, V2, V3, to a mathematical function that models the gain-vs-reverse bias characteristic of the APD elements, and applying the mathematical function as fit to the relative gain data of each element to estimate the reverse bias that will result in a specified value of the relative gain for each element, the mathematical function used to model the gain-vs-reverse bias characteristic of the APD elements is $$M = \frac{V^{n_A}}{\left(1 - \frac{V}{V_B}\right)^{n_B}}$$

where V is the reverse bias voltage, $V_B$ is the best-fit APD breakdown voltage, and $n_A$ and $n_B$ are fit parameters, including illuminating the APD array with a first light level L1, chosen such that the resulting photocurrent of each element of the APD array greatly exceeds that element's dark current in magnitude, performing a plurality of total current measurements I(V1,L1), I(V2,L1), I(V3,L1), at a plurality of APD bias conditions V1, V2, V3, and at the first light level L1, for each element in the APD array, determining each element's total current, which comprises the sum of each element's photocurrent and dark current in that condition, and using the total current measurements for each element of the APD array to control the reverse bias voltages applied across each element of the APD array to reduce response nonuniformity among the elements of the APD array, the nonuniformity correction of the reverse bias voltages applied across each element of the APD array are found by selecting from the plurality of bias conditions tested, V2, V3, the bias conditions for each element resulting in total current closest to some specified value, and/or total current measurements at a plurality of APD bias conditions and reverse bias voltage adjustments are performed iteratively to equalize total current among the elements of the APD array, selecting APD bias conditions in successive iterations based on the current measurements of the previous iteration.

BRIEF DESCRIPTION OF THE DRAWINGS

The foregoing features of this disclosure, as well as the disclosure itself, may be more fully understood from the following description of the drawings in which:

FIG. 9A shows an active detection path and FIG. 9B shows a passive detection path for the circuit of FIG. 8;

DETAILED DESCRIPTION

Figure 1:
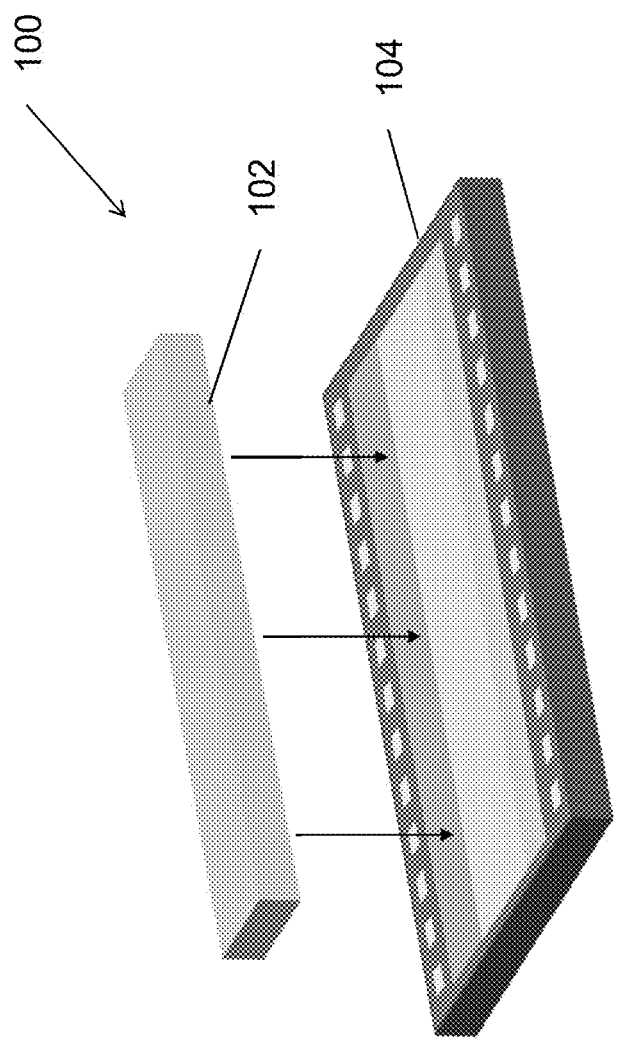
FIG. 1 is a partial exploded isometric sensor including a photodetector array and readout integrated circuit (ROIC), including nonuniformity correction (NUC) in accordance with example embodiments of the disclosure.

Prior to describing example embodiments of the disclosure some information is provided. Laser ranging systems can include laser radar (ladar), light-detection and ranging (lidar), and rangefinding systems, which are generic terms for the same class of instrument that uses light to measure the distance to objects in a scene. This concept is similar to radar, except optical signals are used instead of radio waves. Similar to radar, a laser ranging and imaging system emits a pulse toward a particular location and measures the return echoes to extract the range.

Laser ranging systems generally work by emitting a laser pulse and recording the time it takes for the laser pulse to travel to a target, reflect, and return to a photoreceiver. The laser ranging instrument records the time of the outgoing pulse—either from a trigger or from calculations that use measurements of the scatter from the outgoing laser light—and then records the time that a laser pulse returns. The difference between these two times is the time of flight to and from the target. Using the speed of light, the round-trip time of the pulses is used to calculate the distance to the target.

Lidar systems may scan the beam across a target area to measure the distance to multiple points across the field of view, producing a full three-dimensional range profile of the surroundings. More advanced flash lidar cameras, for example, contain an array of detector elements, each able to record the time of flight to objects in their field of view.

When using light pulses to create images, the emitted pulse may intercept multiple objects, at different orientations, as the pulse traverses a 3D volume of space. The echoed laser-pulse waveform contains a temporal and amplitude imprint of the scene. By sampling the light echoes, a record of the interactions of the emitted pulse is extracted with the intercepted objects of the scene, allowing an accurate multi-dimensional image to be created. To simplify signal processing and reduce data storage, laser ranging and imaging can be dedicated to discrete-return systems, which record only the time of flight (TOF) of the first, or a few, individual target returns to obtain angle-angle-range images. In a discrete-return system, each recorded return corresponds, in principle, to an individual laser reflection (i.e., an echo from one particular reflecting surface, for example, a tree, pole or building). By recording just a few individual ranges, discrete-return systems simplify signal processing and reduce data storage, but they do so at the expense of lost target and scene reflectivity data. Because laser-pulse energy has significant associated costs and drives system size and weight, recording the TOF and pulse amplitude of more than one laser pulse return per transmitted pulse, to obtain angle-angle-range-intensity images, increases the amount of captured information per unit of pulse energy. All other things equal, capturing the full pulse return waveform offers significant advantages, such that the maximum data is extracted from the investment in average laser power. In full-waveform systems, each backscattered laser pulse received by the system is digitized at a high sampling rate (e.g., 500 MHz to 1.5 GHz). This process generates digitized waveforms (amplitude versus time) that may be processed to achieve higher-fidelity 3D images.

Of the various laser ranging instruments available, those with single-element photoreceivers generally obtain range data along a single range vector, at a fixed pointing angle. This type of instrument—which is, for example, commonly used by golfers and hunters—either obtains the range (R) to one or more targets along a single pointing angle or obtains the range and reflected pulse intensity (I) of one or more objects along a single pointing angle, resulting in the collection of pulse range-intensity data, $(R,I)_i$, where i indicates the number of pulse returns captured for each outgoing laser pulse.

More generally, laser ranging instruments can collect ranging data over a portion of the solid angle of a sphere, defined by two angular coordinates (e.g., azimuth and elevation), which can be calibrated to three-dimensional (3D) rectilinear cartesian coordinate grids; these systems are generally referred to as 3D lidar and ladar instruments. The terms "lidar" and "ladar" are often used synonymously and, for the purposes of this discussion, the terms "3D lidar," "scanned lidar," or "lidar" are used to refer to these systems without loss of generality. 3D lidar instruments obtain three-dimensional (e.g., angle, angle, range) data sets. Conceptually, this would be equivalent to using a rangefinder and scanning it across a scene, capturing the range of objects in the scene to create a multi-dimensional image. When only the range is captured from the return laser pulses, these instruments obtain a 3D data set (e.g., angle, angle, range), where the index n is used to reflect that a series of range-resolved laser pulse returns can be collected, not just the first reflection.

Some 3D lidar instruments are also capable of collecting the intensity of the reflected pulse returns generated by the objects located at the resolved (angle, angle, range) objects in the scene. When both the range and intensity are recorded, a multi-dimensional data set [e.g., angle, angle, (range-intensity)$_n$] is obtained. This is analogous to a video camera in which, for each instantaneous field of view (FOV), each effective camera pixel captures both the color and intensity of the scene observed through the lens. However, 3D lidar systems, instead capture the range to the object and the reflected pulse intensity.

Lidar systems can include different types of lasers, including those operating at different wavelengths, including those that are not visible (e.g., those operating at a wavelength of 840 nm or 905 nm), and in the near-infrared (e.g., those operating at a wavelength of 1064 nm or 1550 nm), and the thermal infrared including those operating at wavelengths known as the "eyesafe" spectral region (i.e., generally those operating at a wavelength beyond 1300-nm, which is blocked by the cornea), where ocular damage is less likely to occur. Lidar transmitters are generally invisible to the human eye. However, when the wavelength of the laser is close to the range of sensitivity of the human eye—roughly 350 nm to 730 nm—the light may pass through the cornea and be focused onto the retina, such that the energy of the laser pulse and/or the average power of the laser must be lowered to prevent ocular damage. Thus, a laser operating at, for example, 1550 nm, can—without causing ocular damage—generally have 200 times to 1 million times more laser pulse energy than a laser operating at 840 nm or 905 nm.

One challenge for a lidar system is detecting poorly reflective objects at long distance, which requires transmitting a laser pulse with enough energy that the return signal—reflected from the distant target—is of sufficient magnitude to be detected. To determine the minimum required laser transmission power, several factors must be considered. For instance, the magnitude of the pulse returns scattering from the diffuse objects in a scene is proportional to their range and the intensity of the return pulses generally scales with distance according to $1/R^4$ for small objects and $1/R^2$ for larger objects; yet, for highly-specularly reflecting objects (i.e., those reflective objects that are not diffusively-scattering objects), the collimated laser beams can be directly reflected back, largely unattenuated. This means that—if the laser pulse is transmitted, then reflected from a target 1 meter away—it is possible that the full energy (J) from the laser pulse will be reflected into the photoreceiver; but—if the laser pulse is transmitted, then reflected from a target 333 meters away—it is possible that the return will have a pulse with energy approximately $10^{12}$ weaker than the transmitted energy. To provide an indication of the magnitude of this scale, the 12 orders of magnitude ($10^{12}$) is roughly the equivalent of: the number of inches from the earth to the sun, 10× the number of seconds that have elapsed since Cleopatra was born, or the ratio of the luminous output from a phosphorescent watch dial, one hour in the dark, to the luminous output of the solar disk at noon.

In many cases of lidar systems highly-sensitive photoreceivers are used to increase the system sensitivity to reduce the amount of laser pulse energy that is needed to reach poorly reflective targets at the longest distances required, and to maintain eyesafe operation. Some variants of these detectors include those that incorporate photodiodes, and/or offer gain, such as avalanche photodiodes (APDs) or single-photon avalanche detectors (SPADs). These variants can be configured as single-element detectors-segmented-detectors, linear detector arrays, or area detector arrays. Using highly sensitive detectors such as APDs or SPADs reduces the amount of laser pulse energy required for long-distance ranging to poorly reflective targets. The technological challenge of these photodetectors is that they must also be able to accommodate the incredibly large dynamic range of signal amplitudes.

As dictated by the properties of the optics, the focus of a laser return changes as a function of range; as a result, near objects are often out of focus. Furthermore, also as dictated by the properties of the optics, the location and size of the "blur"—i.e., the spatial extent of the optical signal—changes as a function of range, much like in a standard camera. These challenges are commonly addressed by using large detectors, segmented detectors, or multi-element detectors to capture all of the light or just a portion of the light over the full-distance range of objects. It is generally advisable to design the optics such that reflections from close objects are blurred, so that a portion of the optical energy does not reach the detector or is spread between multiple detectors. This design strategy reduces the dynamic range requirements of the detector and prevents the detector from damage.

Acquisition of the lidar imagery can include, for example, a 3D lidar system embedded in the front of car, where the 3D lidar system, includes a laser transmitter with any necessary optics, a single-element photoreceiver with any necessary dedicated or shared optics, and an optical scanner used to scan ("paint") the laser over the scene. Generating a full-frame 3D lidar range image—where the field of view is 20 degrees by 60 degrees and the angular resolution is 0.1 degrees (10 samples per degree)—requires emitting 120,000 pulses [(20*10*60*10)=120,000)]. When update rates of 30 frames per second are required, such as is required for automotive lidar, roughly 3.6 million pulses per second must be generated and their returns captured.

There are many ways to combine and configure the elements of the lidar system—including considerations for the laser pulse energy, beam divergence, detector array size and array format (single element, linear, 2D array), and scanner to obtain a 3D image. If higher power lasers are deployed, pixelated detector arrays can be used, in which case the divergence of the laser would be mapped to a wider field of view relative to that of the detector array, and the laser pulse energy would need to be increased to match the proportionally larger field of view. For example— compared to the 3D lidar above—to obtain same-resolution 3D lidar images 30 times per second, a 120,000-element detector array (e.g., 200×600 elements) could be used with a laser that has pulse energy that is 120,000 times greater. The advantage of this "flash lidar" system is that it does not require an optical scanner; the disadvantages are that the larger laser results in a larger, heavier system that consumes more power, and that it is possible that the required higher pulse energy of the laser will be capable of causing ocular damage. The maximum average laser power and maximum pulse energy are limited by the requirement for the system to be eyesafe.

As noted above, while many lidar systems operate by recording only the laser time of flight and using that data to obtain the distance to the first target return (closest) target, some lidar systems are capable of capturing both the range and intensity of one or multiple target returns created from each laser pulse. For example, for a lidar system that is capable of recording multiple laser pulse returns, the system can detect and record the range and intensity of multiple returns from a single transmitted pulse. In such a multi-pulse lidar system, the range and intensity of a return pulse from a closer—by object can be recorded, as well as the range and intensity of later reflection(s) of that pulse—one(s) that moved past the closer—by object and later reflected off of more-distant object(s). Similarly, if glint from the sun reflecting from dust in the air or another laser pulse is detected and mistakenly recorded, a multi-pulse lidar system allows for the return from the actual targets in the field of view to still be obtained.

The amplitude of the pulse return is primarily dependent on the specular and diffuse reflectivity of the target, the size of the target, and the orientation of the target. Laser returns from close, highly-reflective objects, are many orders of magnitude greater in intensity than the intensity of returns from distant targets. Many lidar systems require highly sensitive photodetectors, for example APDs, which along with their CMOS amplification circuits may be damaged by very intense laser pulse returns.

For example, if an automobile equipped with a front-end lidar system were to pull up behind another car at a stoplight, the reflection off of the license plate may be significant— perhaps $10^{12}$ higher than the pulse returns from targets at the distance limits of the lidar system. When a bright laser pulse is incident on the photoreceiver, the large current flow through the photodetector can damage the detector, or the large currents from the photodetector can cause the voltage to exceed the rated limits of the CMOS electronic amplification circuits, causing damage. For this reason, it is generally advisable to design the optics such that the reflections from close objects are blurred, so that a portion of the optical energy does not reach the detector or is spread between multiple detectors.

However, capturing the intensity of pulses over a larger dynamic range associated with laser ranging may be challenging because the signals are too large to capture directly. One can infer the intensity by using a recording of a bit-modulated output obtained using serial-bit encoding obtained from one or more voltage threshold levels. This technique is often referred to as time-over-threshold (TOT) recording or, when multiple-thresholds are used, multiple time-over-threshold (MTOT) recording.

FIG. 1 shows an example sensor 100 having a linear mode avalanche photodetector (APD) array 102 and a readout integrated circuit (ROIC) 104 with nonuniformity correction (NUC) in accordance with example embodiments of the disclosure. In some embodiments, the sensor 100 may comprise a time-of-flight (ToF) sensor for receiving light energy from a remote source or target. As described more fully below, in example embodiments, non-uniformity correction (NUC) is used to equalize the gain of the APD elements across the array 102 for improving uniformity of sensitivity across the receiver.

Figure 2:
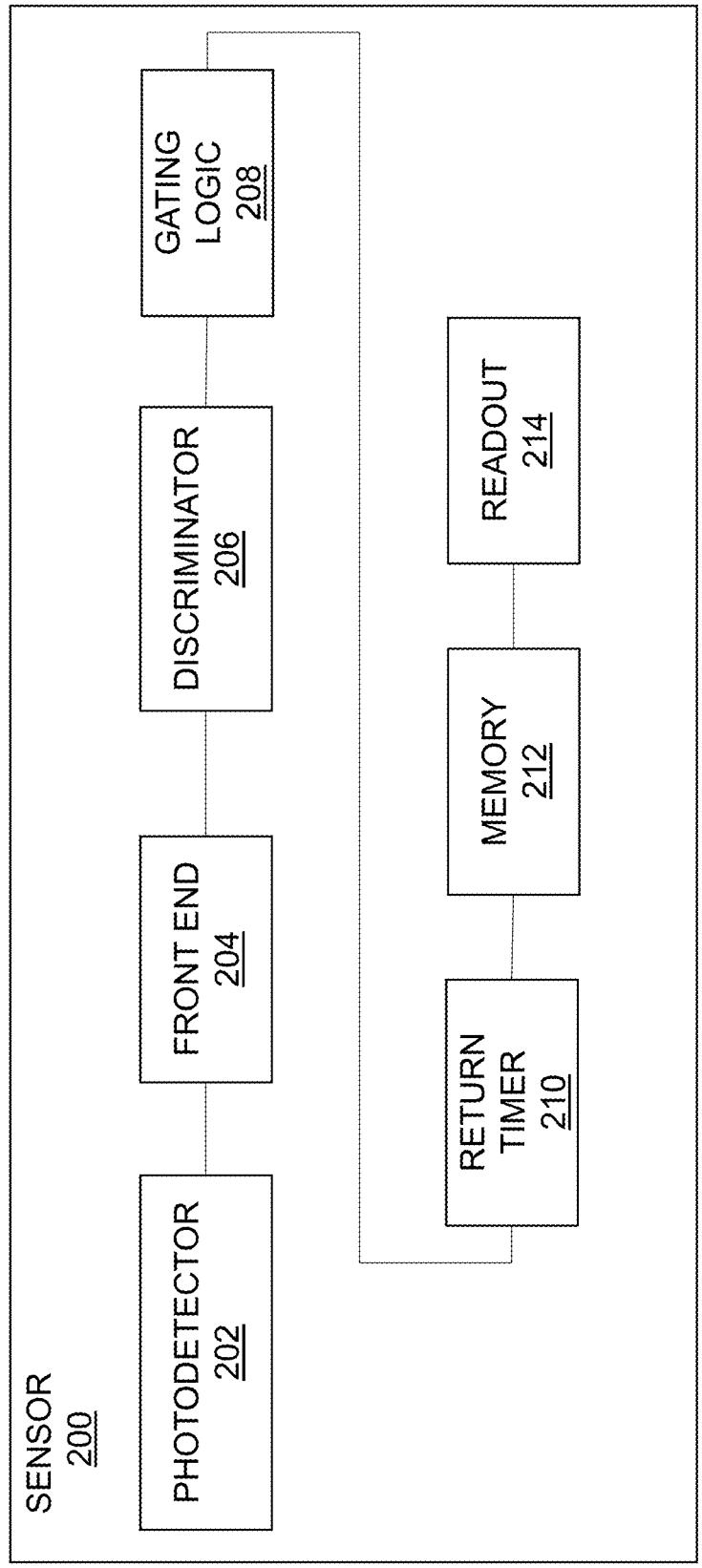
FIG. 2 is a block diagram of an example implementation of the sensor of FIG. 1.

FIG. 2 shows an example LIDAR time-of-flight sensor 200 having photodetectors in accordance with example embodiments of the disclosure. The sensor 200 can include a photodiode 202 array to detect photons reflected from a target illuminated with transmitted energy. A front-end circuit 204, which may include an amplifier for example, receives a current pulse generated by an optical pulse on the photodiode 202 and converts the current signal into an output, for example, an output voltage pulse. A discriminator circuit 206, such as a voltage discriminator, can determine if the current pulse, or its representation after signal conversion by the front-end circuit, is above one or more thresholds. Gating logic 208 receives an output from the discriminator 206 to match received signals with transmitted signals, for example. A return timer circuit 210, which can include a time-to-digital converter (TDC) for generating time-stamps, can determine the time from signal transmission to signal return so that a distance from the sensor to the target can be determined based on so-called time of flight. A memory 212 can store signal information, such as time of flight, time over threshold, and the like. A readout circuit 214-enables information to be read from the sensor.

A data processing and calibration circuit 213 may be inserted between the memories 212 and the readout 214 which may perform any number of data correction or mapping functions. For example, the circuit may compare timing return information to timing reference information and convert timing return information into specific range information. Additionally, the circuit may correct for static or dynamic errors using calibration and correction algorithms. Other possible functions include noise reduction based on multi-return data or spatial correlation or objection detection. A possible mapping function may be to reshape the data into point-cloud data or to include additional probability data of correct measurement values based on additionally collected information from the sensor.

Figure 3:
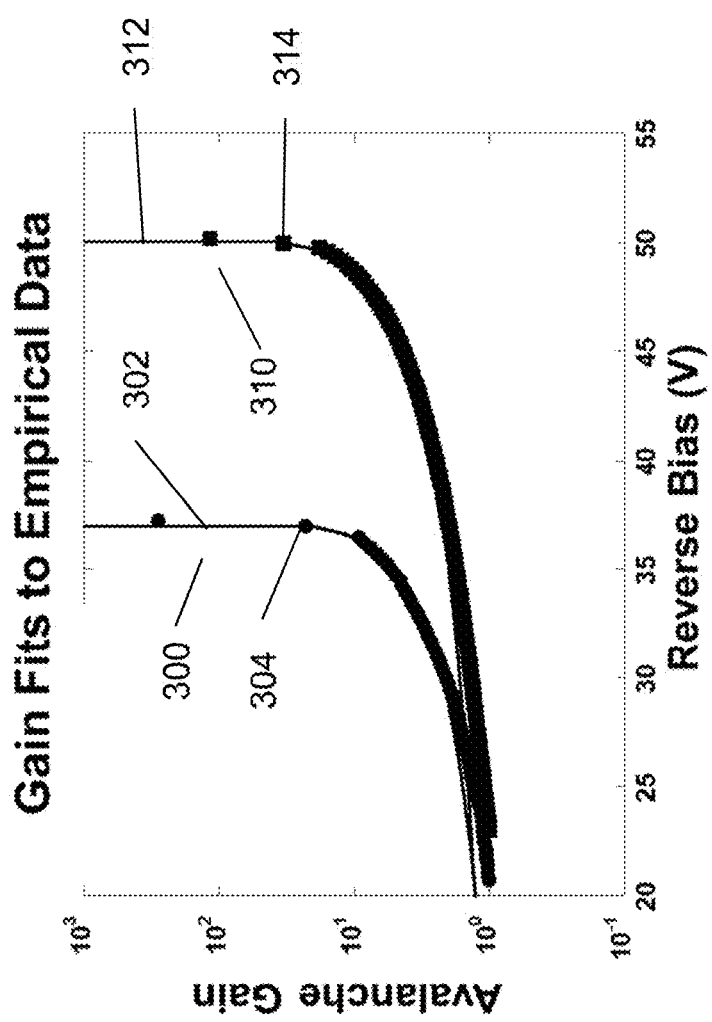
FIG. 3 is a graphical representation of avalanche photodiode gain versus reverse bias voltage.

FIG. 3 shows the gain fits to empirical data for two different APD lots 300 and 310. The measured gain is shown as the data points 304 and 314 and the fit is shown with the solid lines 302 and 312. FIG. 3 is a graphical representation of APD gain variation shown as avalanche gain versus reverse bias voltage. Gain variation as a function of reverse bias can be modeled in the vicinity of an APD's breakdown voltage by this empirical equation (1) below:

$$M = \frac{V^{n_A}}{\left(1 - \frac{V}{V_B}\right)^{n_B}}$$

where V is the reverse bias, $V_B$ is the APD breakdown voltage, and $n_A$ and $n_B$ are fit parameters. Best-fit values of the free parameters $V_B$, $n_A$, and $n_B$ may be determined from a set of empirical measurements of avalanche gain (M) at particular values of the reverse bias (V) using curve-fitting software which implements standard algorithms known to those skilled in the art, such as the method of least squares. This equation can be used to approximate the gain-voltage characteristics of APDs manufactured in a given lot by curve-fitting data taken from a sample of APDs produced in the lot. Once fit to a given manufacturing lot, the equation can then be used to estimate required non-uniformity corrections to the anode bias of a given APD from that lot, based on a measurement of that APD's uncorrected gain at some non-adjusted reverse bias. Alternatively, this equation can be fit to gain-voltage data collected from an individual pixel, allowing highly accurate and individualized estimation of the needed nonuniformity correction to that individual APD's anode bias.

Figures 4A, 4B:
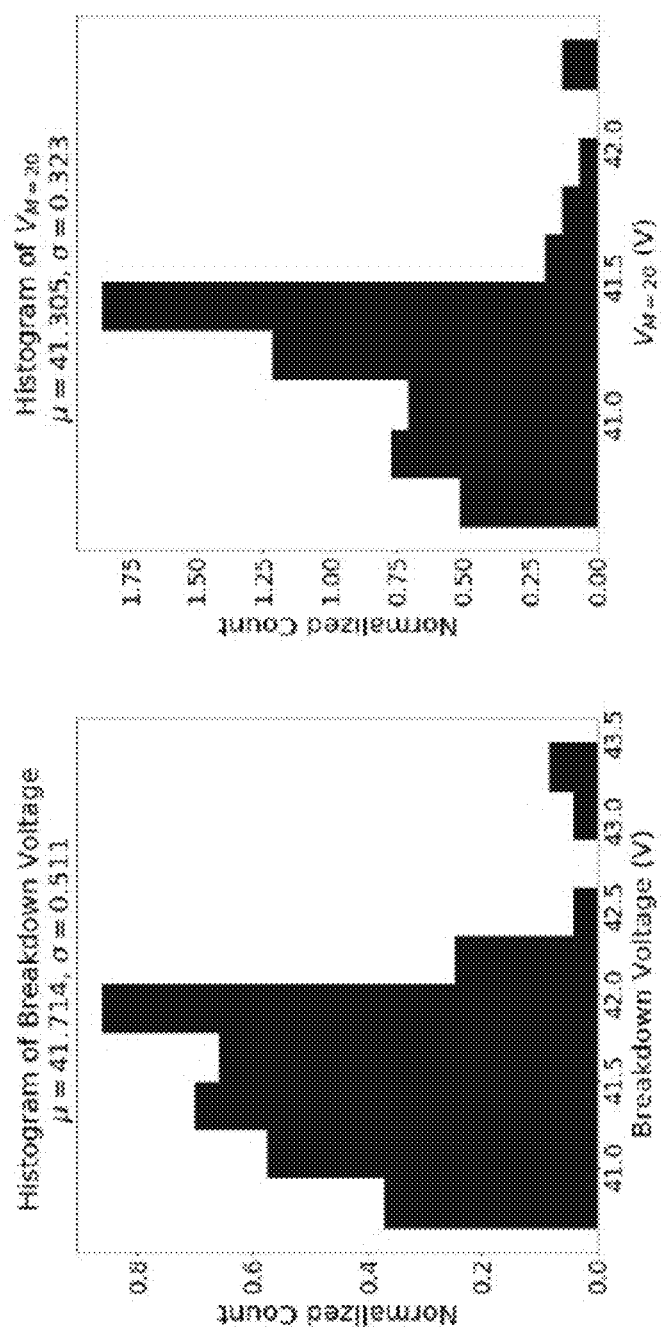
FIG. 4A is a histogram of photodiode breakdown voltage and FIG. 4B is a histogram reverse bias voltage required to achieve a constant avalanche gain of M=20.

FIG. 4A shows a histogram of breakdown voltage $V_B$ for some number of photodiodes. The average breakdown voltage µ for the sample is about 41.714 V and the standard deviation σ is about 0.511 V. FIG. 4B shows a histogram of reverse bias voltages required to result in a uniform APD gain of M=20. The average µ is about 41.305 V and the standard deviation σ is about 0.323 V.

Figure 4C:
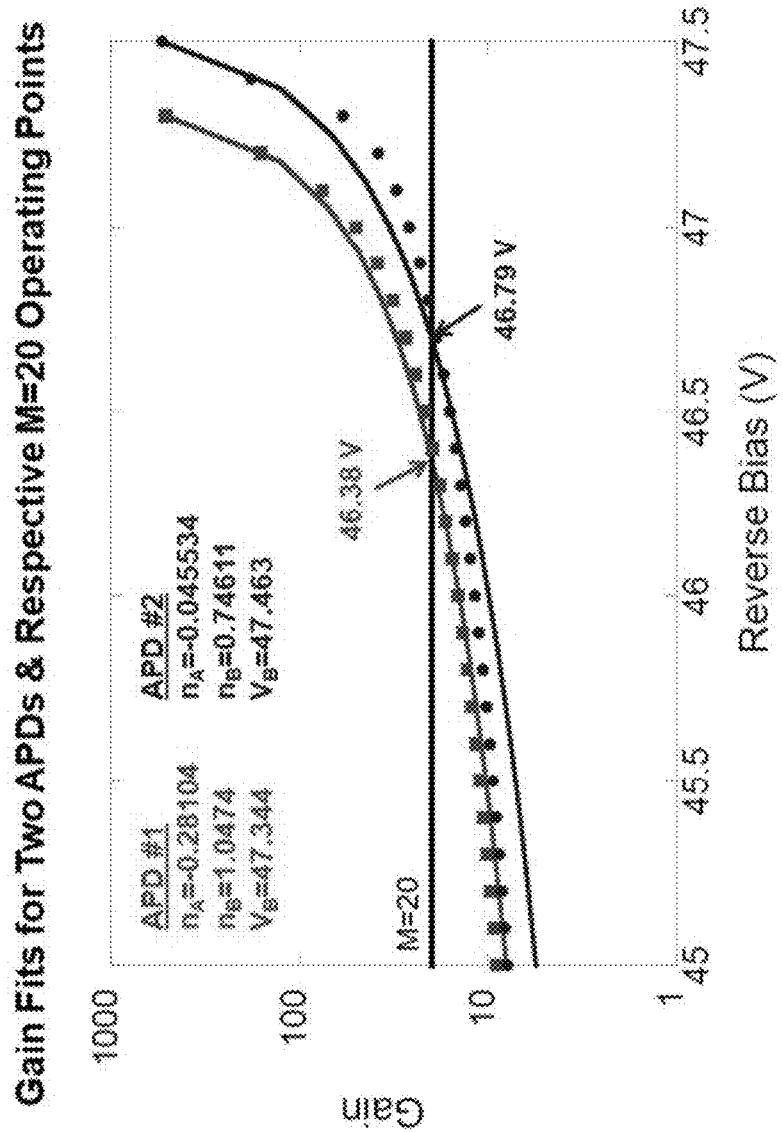
FIG. 4C shows example gain fitting for two APDs for respective operating points.

FIG. 4C shows an example plot demonstrating the difference in gain versus reverse bias voltage between APDs (shown as APD#1, APD#2) for M=20 operating points, as well as gain fitting. Referring to Equation (1) above, gain variation as a function of reverse bias is modeled in the vicinity of an APD's breakdown voltage based on V as the reverse bias, $V_B$ as the APD breakdown voltage, and $n_A$ and $n_B$ as fit parameters. For APD#1 to operate at a gain of M=20 the reverse bias is 46.38 V and for APD#2 the reverse bias is 46.79 V.

In embodiments, a sensor, such as a ToF sensor, includes a mode of operation in which the receiver can operate in a "passive" mode in which the pixels of the receiver are not measuring the timing and amplitude of optical return pulses. In the passive mode, the receiver is measuring the direct current (DC) photocurrent in the individual APD elements. The passive mode of operation can include one or more features for measuring APD direct current. In some embodiments, APD photocurrent is integrated over a defined time period. In embodiments, measurement of the amplified APD current is performed by a current/voltage (I/V) converter. In general, passive measurement circuits can produce a potential (or digitized potential) that is representative of the APD DC current or a time measurement that is representative of the APD DC current.

In addition to the passive operational mode, in embodiments the sensor should have the integrated ability to control the pixelated anodes of the APD array, such as a common cathode based APD array, thus allowing of control of the reverse bias for the individual elements within the APD array. Pixelated control of the anode potential can be such as by integrating a user programmable digital-to-analog converter (DAC) and local memory cell in each pixel to set the APD anode potential. The performance of such a pixelated DAC may be limited, such as to a 1-2 V range with 4-6 bits of resolution.

Figure 5:
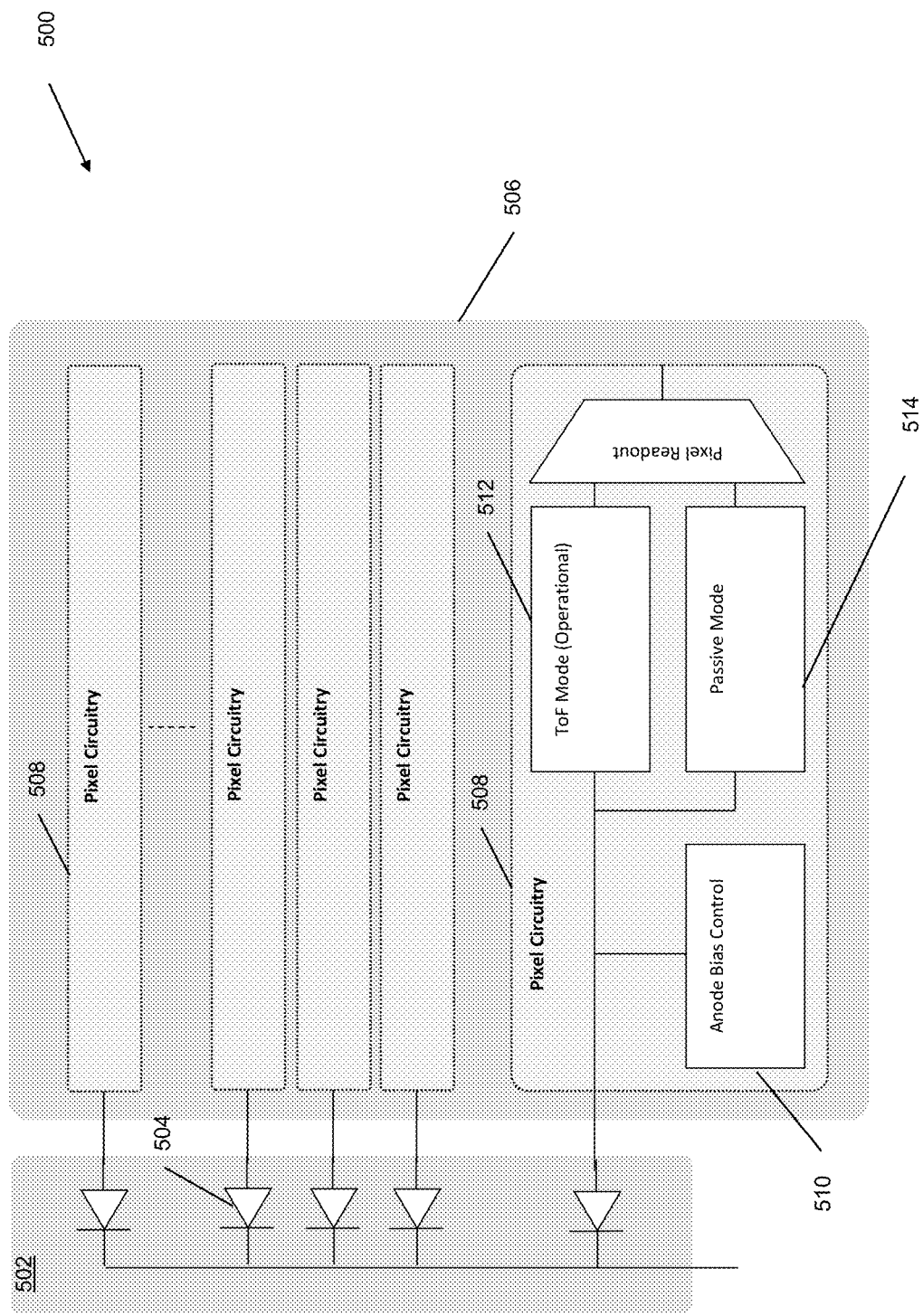
FIG. 5 is a schematic representation of an example sensor including an APD array and a ROIC configured for NUC.

FIG. 5 shows an example embodiment of a ToF sensor 500 having NUC in accordance with example embodiments of the disclosure. The sensor 500 includes an APD array 502 comprising a series of APD elements 504 having a common cathode configuration. In embodiments, a ROIC 506 comprises a respective pixel circuitry module 508 for coupling to each APD 504 in the array. An example pixel circuitry module 508 comprises a ToF module 512 that may be active during ToF operation of the sensor. A respective anode bias control module 510 and a respective passive mode module 514 is coupled to each APD element 504 in the array.

While example embodiments of the disclosure show a particular diode polarity, in other embodiments the diode polarity is switched. For example, instead of anode bias control, as shown and described above, a cathode bias control module can bias the cathodes of diodes sharing a common anode.

Figure 6:
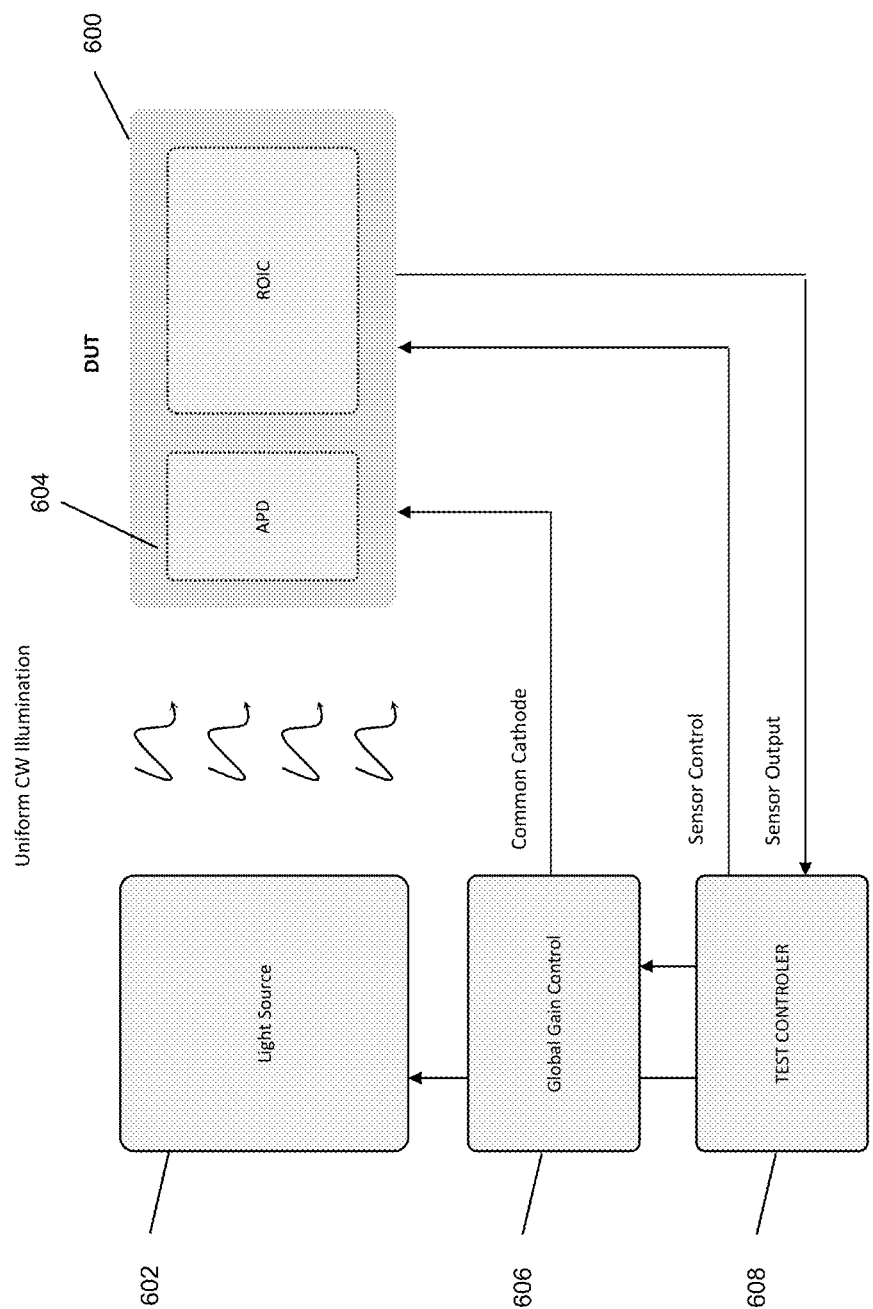
FIG. 6 is an example NUC calibration setup for the sensor of FIG. 5 as a device under test (DUT)

FIG. 6 shows an example NUC calibration configuration for a sensor 600 device under test (DUT). Using the passive operational mode and pixelated anode control integrated into the receiver, APD array NUC can be performed. In an example process, uniform optical illumination of the receiver is achieved using a stable continuous wave (CW) optical signal source 602 that is within the optical band of the APD 604 of the sensor 600. In embodiments, the irradiance at the sensor 600 does not need to be calibrated since it is only required that the optical illumination is stable and uniform across the sensor optical active area. The illumination can be blocked or turned off such that the receiver is in "dark" state. During the NUC procedure, in embodiments, the APD reverse bias can be adjusted to globally modulate the gain of the APD elements through the common cathode potential via a global gain control module 606. A test controller module 608 can provide sensor control signals and receive sensor output data.

As noted above, the example embodiment of FIG. 6 may be modified to switch the polarity of the APDs and bias configuration.

Figure 7A:
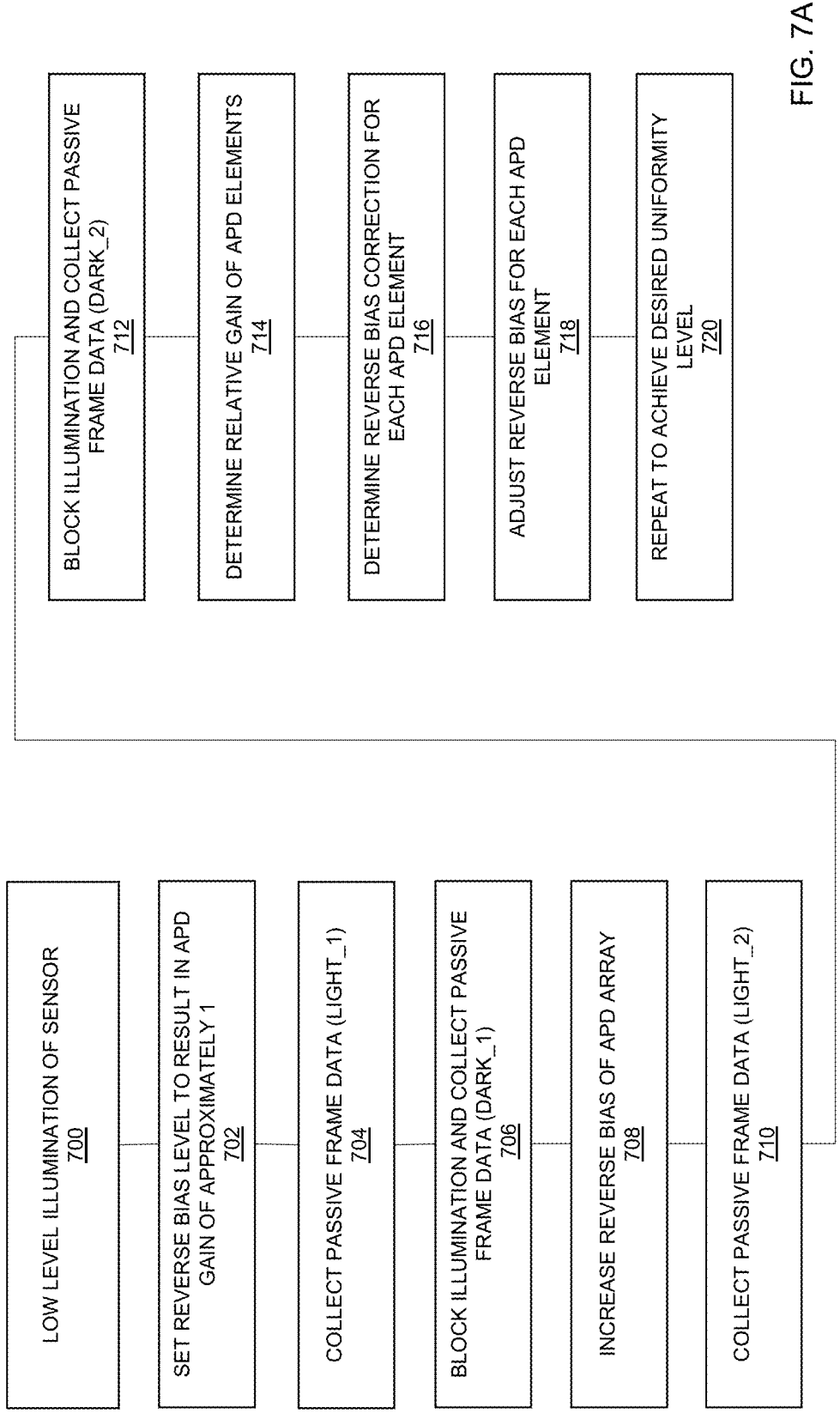
FIG. 7A is a flow diagram showing an example sequence of steps for NUC for a sensor having an APD array.

FIG. 7A shows an example sequence of steps for NUC assuming the above-described sensor DUT configuration. For each measurement, multiple passive frames may be captured and subsequently averaged to reduce the noise of the passive measurement. In step 700, a low level of illumination sufficient to generate photocurrent that can be accurately resolved is provided to the sensor with the APD array operated at a low-bias reference point for which the gains of the APD array pixels are 1 or greater. In step 702, the gain of the APD element is set to approximately 1, through adjustment of the reverse bias level. In step 704, passive frames are collected and averaged to determine the sum of each APD pixel's photo and dark current under illumination (Light_1). In step 706, the illumination is blocked with the APD array still operating at the low-bias reference point. Passive frames are collected to determine each APD pixel's dark current in absence of illumination (Dark_1). In step 708, with the same low level of illumination, the reverse bias supplied to the APD array is increased to the value at which the sensor will be operated, for which NUC is desired. In step 710, passive frames are collected and averaged to determine the sum of each APD pixel photo and dark current under illumination (Light_2). In step 712, the illumination is blocked with the APD array still at the operational reverse bias. Passive frames are collected to determine the APD dark current in absence of illumination (Dark_2). In step 714, using these four averaged passive frames, for example, the relative gain of each APD element can be calculated using: (Light_2−Dark_2)/(Light_1−Dark_1). In step 716, based on the relative gain of each APD element and the functional form of the relative gain-vs-reverse bias characteristic of the wafer on which the APD array was manufactured (which can be found by separate measurements prior to sensor assembly), a reverse bias correction can be calculated for each APD element that will substantially reduce gain non-uniformity across the APD array. In step 718, the reverse bias supplied to each APD element, and the resultant gain of each element, can be adjusted using the integrated anode control circuitry within the sensor. In optional step 720, this measurement process can then be repeated until the uniformity of the receiver reaches acceptable levels.

Additional calibration measurements may be taken for different operating conditions such as multiple APD gain (reverse bias) settings or operating temperatures. These multiple calibration measurements may be used to extrapolate calibration configurations for any number or combinations of conditions over which calibration of APD gain is desired.

It is understood that APD data can be collected in a variety of ways to meet the needs of a particular application for NUC. For example, in some embodiments, NUC data collection can include collecting coarse, uncorrected gain-voltage data from each pixel in a given array in the vicinity of breakdown. For instance, if based on earlier die screening it is known that none of the pixels in a particular array die break down below 49 V, one might make gain measurements at 45 V, 46, V, 47 V, 47.5 V, 48 V, 48.25 V, 48.5 V, and 48.75 V. This individualized gain-voltage data can be fitted to Equation (1), for example, for computing a more accurate correction to the APD anode bias to achieve a desired gain. In this arrangement, multiple light and dark frames (light_2, 3,4,5,6 & dark_2,3,4,5,6 etc., as shown and described in FIG. 7A), can be taken around the target gain at slightly different APD bias levels, after which gain fits can be made individually to data from each pixel to determine its needed bias correction.

In another embodiment, NUC data collection can include collecting fine, uncorrected gain-voltage data from each pixel in a given array, in the vicinity of breakdown, and either: sorting the data points to find the one closest to the desired gain and using that to find an associated pixel anode adjustment; and/or extrapolating between the two data points closest to the desired gain to find an associated pixel anode adjustment. In general, this approach only works well with relatively dense data point information due to the nonlinear dependence of gain on voltage near breakdown. In contrast to the above embodiment, each curve is not gain fitted. Rather, reverse bias correction is determined directly, or with interpolation between measured data points.

Figure 7B:
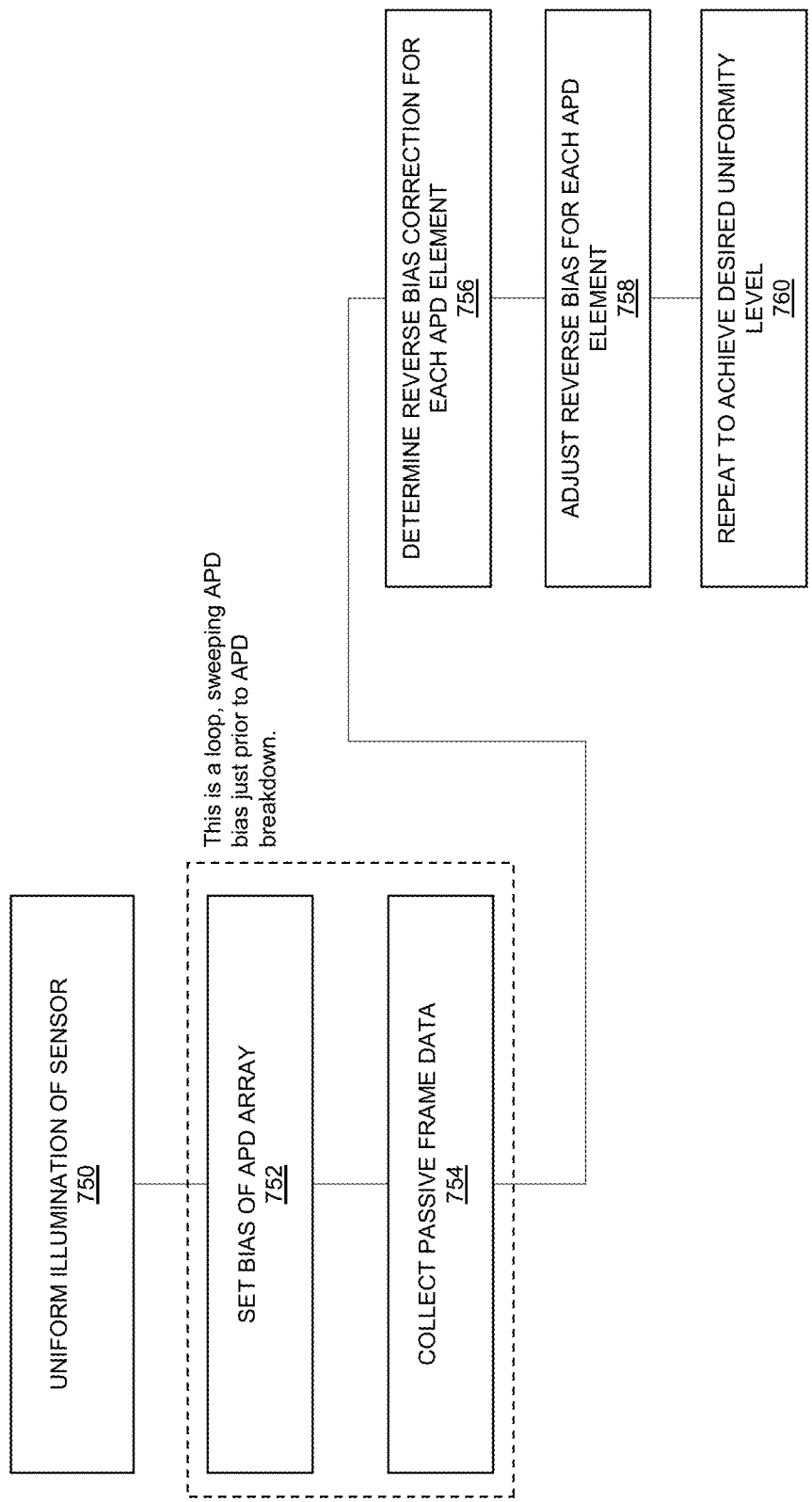
FIG. 7B is a flow diagram showing an example sequence of steps for NUC for a sensor having an APD array.

FIG. 7B shows an example sequence of steps for achieving a desired uniformity level including reverse bias correction adjustment in accordance with example embodiments of the disclosure. In step 750, a light source provides uniform illumination of an array, at sufficient intensity such that the resulting pixel photocurrent greatly exceeds the pixel dark current in magnitude. In this condition, pixel-to-pixel differences in total current are predominantly determined by pixel-to-pixel differences in responsivity rather than differences in dark current, such that the current measurement can be used to infer differences in gain. In step 752, a bias level for the APD array is set. In step 754, passive frame data for the array is collected and the DC current is determined for each of the individual APD elements. Steps 752 and 754 are then repeated for multiple points surrounding the target APD gain level. In step 756, a reverse bias correction for each APD element is determined based on the collected data to equalize the DC current for pixels within the array. In step 758, the reverse bias is adjusted for at least some of the APD elements. In step 760, one or more of the steps above is repeated until the desired level of uniformity is achieved.

The calibration measurement data may also be used as reference information to help identify APD failures during operation or over sensor lifetime. One embodiment method of this concept is to compare the dark passive frame measurement at calibration to dark passive measurements periodically during operation or at sensor power-on. This embodiment requires a method for optically shielding the sensor from any photo input, however, this may be a common feature in system applications to protect the sensitive detectors and amplification circuitry from excessive optical inputs. Further, these fault detection methods may be utilized by automotive safety systems to achieve a specific Automotive Safety Integration Level (ASIL) as required by ISO 26262 "Road Vehicles—Functional Safety."

Advantages of passive APD NUC in accordance with example embodiments of the disclosure include that the optical illumination of the receiver during the NUC process is CW, as opposed to a pulsed optical source. The ability to produce uniform CW illumination across the entire APD array is simpler than producing a uniform pulsed illumination. In addition, the use of uniform pulsed illumination of the receiver can also result in crosstalk artifacts in the receiver output data due to simultaneous activation of all the pixels within the receiver at the same time.

Figure 8:
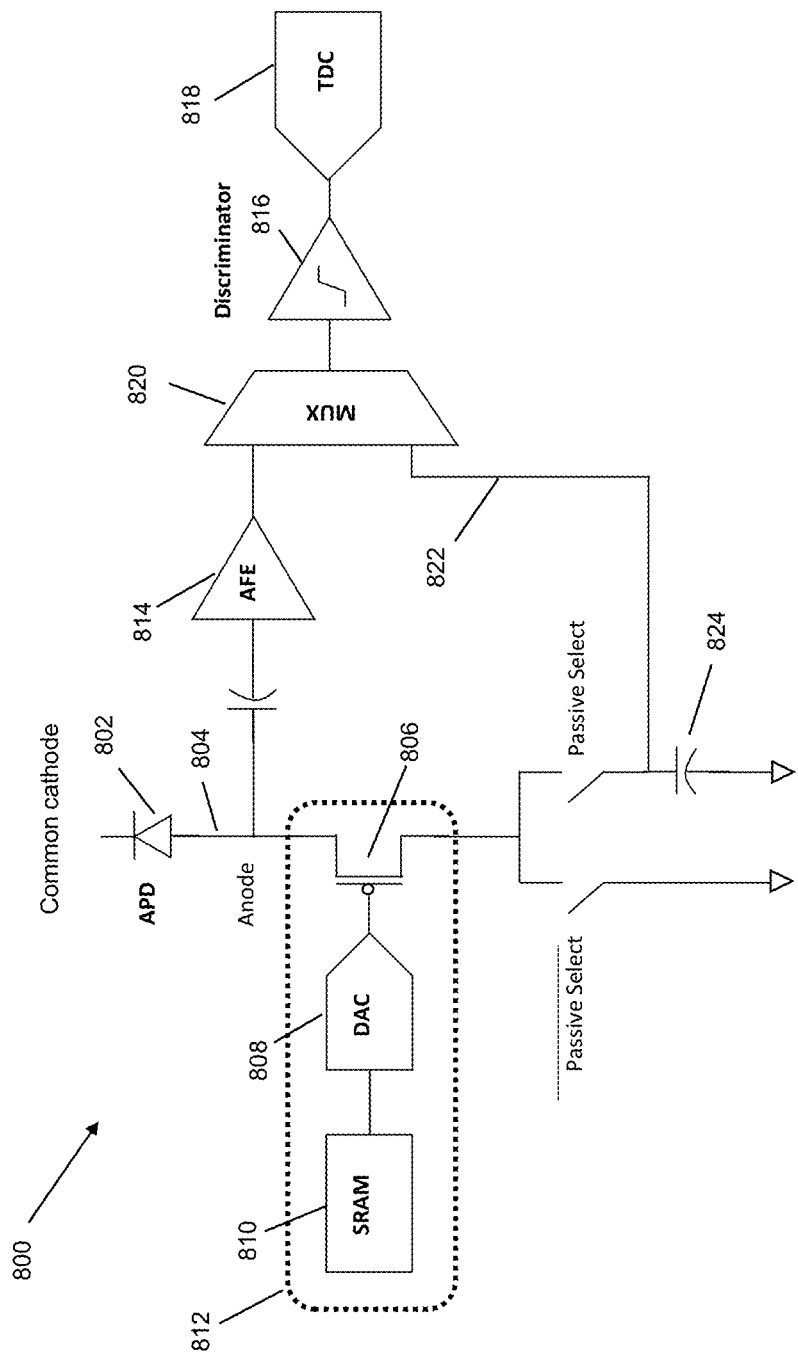
FIG. 8 is a partial example circuit implementation of the pixel circuitry in the sensor of FIG. 5.

FIG. 8 is a block diagram of an example sensor 800 having a direction injection (DI) configuration and providing NUC in accordance with example embodiments of the disclosure. In general, in example embodiments biasing an avalanche photodiode (APD) array in a direct injection (DI) configuration can support a number of features. In embodiments, a sensor includes individual pixelated control of the APD anode for controlling photodiode reverse biasing using a DI transistor, e.g., a P-channel Field Effect Transistor (PFET), a digital-to-analog converter (DAC), and/or SRAM. High output impedance of the DI PFET device at high frequencies results in good charge injection to the active detection path for transient signals and desired attenuation of low frequency signals. An integrated passive mode can be used for passive imaging and/or for gain non-uniformity correction (NUC) of the APD. In embodiments, passive mode operation is based on a direct injection (DI) integration. An integrated voltage may be passed to a discriminator and time-to-digital converter (TDC) to generate time-to-threshold timing information. DI based biasing can also be replaced with a buffered direct injection (BDI) structure to improve regulation of APD anode potential.

It is understood that a circuit of equivalent function can be configured to adjust the bias of an APD from the cathode side in common-anode embodiments."

In the illustrated embodiment, the example sensor 800 includes photodetectors 802, such as photodiodes, in a common cathode configuration. The anode 804 of each photodetector 802 is coupled to a transistor 806, such as a PFET, having a conduction state coupled to a digital to analog converter (DAC) 808, which is coupled to memory 810, such as SRAM. The memory 810 can store NUC information for the bias level for each APD element. The PFET 806, DAC 808, and memory 810 can comprise an anode bias control module 812, which is an example implementation of the anode bias control module 510 in FIG. 5.

The photodiode 802 is coupled to a front end module, which may include an amplifier 814, and discriminator 816, such as a voltage discriminator. A time-to-digital converter (TDC) 818 can receive the output of the discriminator 816 for providing a digital. representation of the time of a received pulse. in embodiments, an optical pulse received by the photodiode 802 results in a current pulse from the photodiode that can be converted by the front end module 814 into a. voltage signal used for comparison with a threshold by the discriminator 816. When the threshold is exceeded, the TDC 818 can record the start time, end time, and/or duration of the exceedance.

In the illustrated embodiment, a multiplexer 820 can select the AFE 814 output or a passive mode signal 822. The PFET 806 may be coupled to an integration capacitor 824 in the passive mode and to ground in the non-passive mode. As described above, the integration capacitor 824 can integrate current from the photodiode 802 in the passive mode as part of NUC processing.

In other embodiments, as noted above, the polarity of the diode can be reversed.

In another embodiment, the passive mode operation captures an instantaneous photo-current from the photo-diode/APD and the individual APD bias is modulated by common mode circuit control which is similarly programmable for each individual pixel/APD with a memory element and a DAC. Other embodiments must generally include a method for measuring passive photo-current from the APD and must have a method for individually controlling the APD reverse bias.

For the circuit implementation of FIG. 8, FIG. 9A shows an active detection path when received pulses are detected and processed for time-stamp of optical pulse arrival and FIG. 9B shows a passive detection path for which the TDC output is a time-stamp for a time-to-threshold indication of DC current in the APD.

Figure 10:
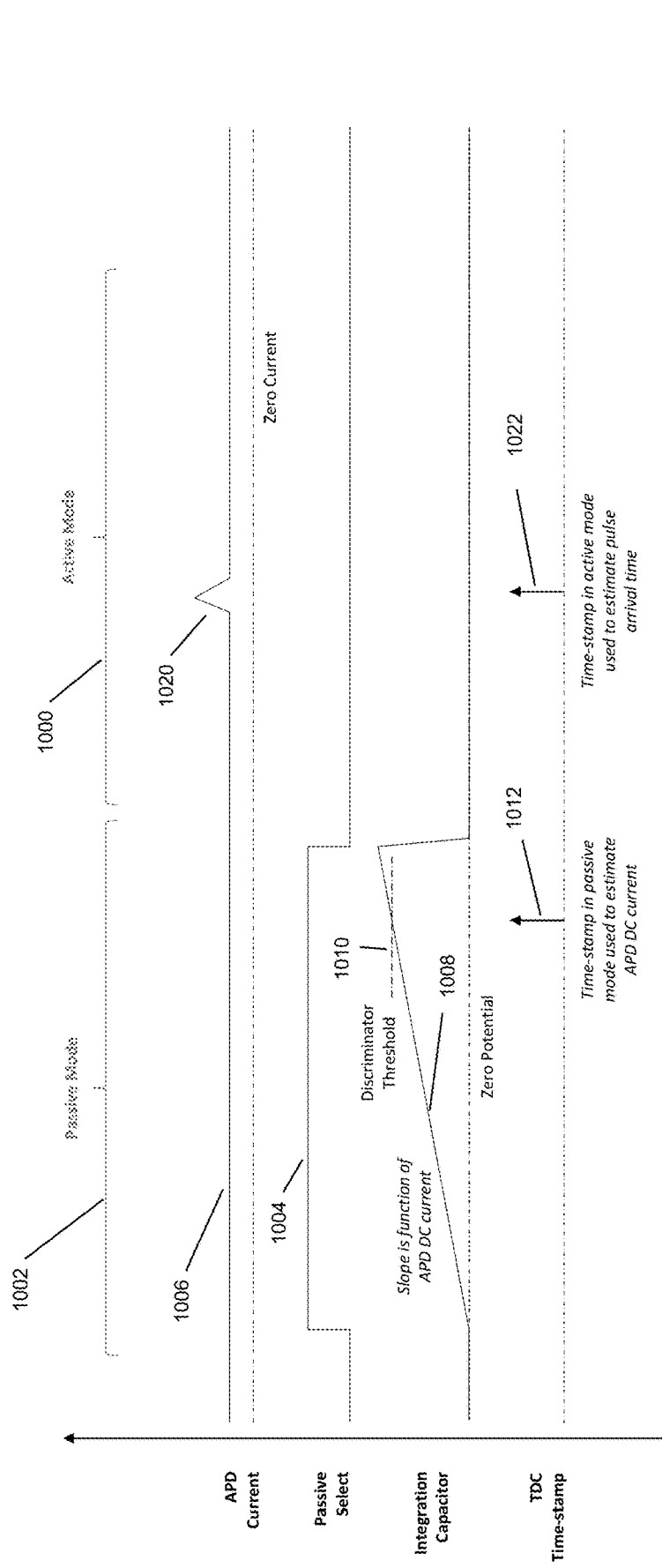
FIG. 10 is a waveform diagram showing signals in a ToF sensor for active operation and passive operation for NUC.

FIG. 10 is a waveform diagram showing sensor operation in active operation 1000 and passive operation 1002 for NUC. passive mode 1002, which corresponds to an active passive select signal 1004, APD current 1006 is relatively constant. A voltage level 1008 on the integration capacitor ramps up at a slope corresponding to API) DC current level. When the voltage level 1008 on the integration capacitor reaches a threshold 1010 for the voltage discriminator, a time-stamp 1012 is generated by the TDC.

During active mode operation 1000, APD current 1006 includes a pulse 1020 generated in response to a receive optical pulse. The pulse 1020, if of sufficient magnitude, causes the TDC to generate a time stamp 1022 corresponding to time-of-arrival for the pulse 1020.

Figure 11:
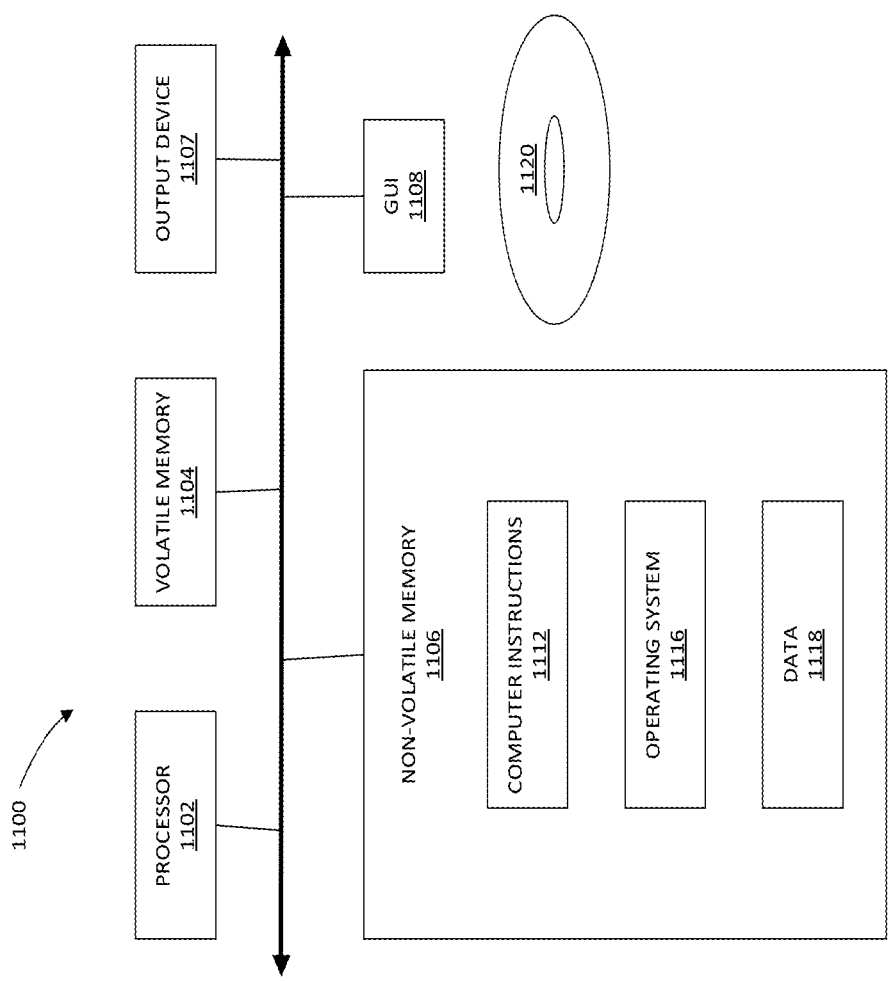
FIG. 11 is a schematic representation of an example computer that can perform at least a portion of the processing described herein.

FIG. 11 shows an exemplary computer 1100 that can perform at least part of the processing described herein. For example, the computer 1100 can perform processing to control circuitry for performing NUC, as described above. The computer 1100 includes a processor 1102, a volatile memory 1104, a non-volatile memory 1106 (e.g., hard disk), an output device 1107 and a graphical user interface (GUI) 1108 (e.g., a mouse, a keyboard, a display, for example). The non-volatile memory 1106 stores computer instructions 1112, an operating system 1116 and data 1118. In one example, the computer instructions 1112 are executed by the processor 1102 out of volatile memory 1104. In one embodiment, an article 1120 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable embedded processors executing one or more computer programs to perform the functions of the system. All or part of the system may be implemented as, special purpose logic circuitry (e.g., an FPGA (field programmable gate array) and/or an ASIC (application-specific integrated circuit)).

All or portions of this processing may also be accomplished in the sensor. Advantages of this include limiting data output to control or applications systems or increasing the speed of corrected, remapped, filtered, or calibrated data.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

The invention claimed is:

1. A method, comprising:
   for a sensor having an avalanche photodiode (APD) array and an integrated circuit having a bias control module and a passive/active mode module;
   measuring currents from the APD array;
   individually controlling reverse bias voltages applied across each element in the APD array to reduce response nonuniformity among the elements of the APD array; and
   selecting a nonuniformity bias correction for each element based on the measured currents from the APD array.

2. The method according to claim 1, further including integrating the currents from the APD array for one or more defined amounts of time.

3. The method according to claim 1, further including converting currents from the APD array to voltage levels.

4. The method according to claim 1, wherein the APD array has a common cathode configuration.

5. The method according to claim 1, wherein the APD array has a common anode configuration.

6. The method according to claim 1, further including illuminating the APD array with a first light level L1 and a second light level L2.

7. The method according to claim 6, further including illuminating the APD array at the first and second light levels L1 and L2 with a continuous wave (CW) light source.

8. The method according to claim 6, wherein one of first and second light levels L1 or L2 is the non-illuminated dark condition.

9. The method according to claim 6, further including performing a current measurement I(V1,L1) at a first APD bias condition V1 and the first light level L1, for each element in the APD array, determining each element's total current, which comprises the sum of each element's photocurrent and dark current in that condition.

10. The method according to claim 9, further including performing a current measurement I(V1,L2) at a first APD bias condition V1 and the second light level L2, for each element in the APD array, determining each element's total current, which comprises the sum of each element's photocurrent and dark current in that condition.

11. The method according to claim 10, further including performing a current measurement I(V2,L1) at a second APD bias condition V2 and the first light level L1, for each element in the APD array, determining each element's total current, which comprises the sum of each element's photocurrent and dark current in that condition.

12. The method according to claim 11, further including performing a current measurement I(V2,L2) at a second APD bias condition V2 and the second light level L2, for each element in the APD array, determining each element's total current, which comprises the sum of each element's photocurrent and dark current in that condition.

13. The method according to claim 12, further including determining a relative gain of each element in the APD array in the two bias conditions, V1 and V2, from the four current measurements I(V1,L1), I(V1,L2), I(V2,L1), and I(V2,L2).

14. The method according to claim 13, further including determining the gain of each element of the APD array at bias condition V2 relative to its gain at bias condition V1 as:
   Abs[I(V2,L1)−I(V2,L2)]/Abs[I(V1,L1)−I(V1,L2)],
   where Abs[x] represents the absolute value of quantity x, and
   using the relative gains computed for each element of the APD array to control the reverse bias voltages applied across each element to reduce the response nonuniformity among the elements of the APD array.

15. The method according to claim 1, wherein the bias control module comprises a memory, a digital-to-analog converter (DAC), and a transistor, which is coupled to a first one of the elements in the APD array.

16. The method according to claim 15, wherein the passive/active mode module comprises an active/passive switch and an integration capacitor, wherein the first one of the elements in the APD array, the transistor, the active/passive switch, and the integration capacitor provide a direct injection integrator mode for the sensor in active mode.

17. The method according to claim 16, wherein the sensor comprises a time-to-digital converter (TDC) for generating time-stamp when a voltage level on the integration capacitor exceeds a threshold.

18. The method according to claim 17, further including performing a plurality of total current measurements I(V1,L1), I(V2,L1), I(V3,L1), etc., at a plurality of APD bias conditions and at the first light level L1, for each element in the APD array, and determining each element's total current, which comprises the sum of each element's photocurrent and dark current in that condition.

19. The method according to claim 18, further including performing a plurality of total current measurements I(V1,L2), I(V2,L2), I(V3,L2), at a plurality of APD bias conditions V1, V2, V3, and at the second light level L2, for each element in the APD array, and determining each element's total current, which comprises the sum of each element's photocurrent and dark current in that condition.

20. The method according to claim 19, further including determining the gains of each element of the APD array at the plurality of bias conditions V2, V3 relative to its gain at bias condition V1, as:
   Abs[I(V,L1)−I(V,L2)]/Abs[I(V1,L1)−I(V1,L2)], where V represents one of the plurality of APD bias conditions V2, V3 and Abs[x] represents the absolute value of quantity x, and using the relative gains computed for each element of the APD array to control the reverse bias voltages applied across each element of the APD array to reduce the response nonuniformity among the elements of the APD array.

21. The method according to claim 20, wherein the nonuniformity correction of the reverse bias voltages applied across each element of the APD array are found by selecting from the plurality of bias conditions tested, V2, V3, the bias condition for each element resulting in the relative gain closest to some specified value.

22. The method according to claim 20, wherein the nonuniformity correction of the reverse bias voltages applied across each element of the APD array are found by selecting from the plurality of bias conditions tested, V2, V3, the two bias conditions for each element resulting in relative gains closest to some specified value, and estimation of the reverse bias that will result in the specified value of relative gain by linear interpolation.

23. The method according to claim 20, wherein the nonuniformity correction of the reverse bias voltages applied across each element of the APD array are found by fitting the plurality of relative gain values calculated for the plurality of bias conditions tested, V2, V3, to a mathematical function that models the gain-vs-reverse bias characteristic of the APD elements, and applying the mathematical function as fit to the relative gain data of each element to estimate the reverse bias that will result in a specified value of the relative gain for each element.

24. The method according to claim 23, wherein the mathematical function used to model the gain-vs-reverse bias characteristic of the APD elements is $$M = \frac{V^{n_A}}{\left(1 - \frac{V}{V_B}\right)^{n_B}}$$

where V is the reverse bias voltage, $V_B$ is the best-fit APD breakdown voltage, and $n_A$ and $n_B$ are fit parameters.

25. The method according to claim 1, further including illuminating the APD array with a first light level L1, chosen such that the resulting photocurrent of each element of the APD array greatly exceeds that element's dark current in magnitude.

26. The method according to claim 25, further including performing a plurality of total current measurements I(V1, L1), I(V2,L1), I(V3,L1), at a plurality of APD bias conditions V1, V2, V3, and at the first light level L1, for each element in the APD array, determining each element's total current, which comprises the sum of each element's photocurrent and dark current in that condition, and using the total current measurements for each element of the APD array to control the reverse bias voltages applied across each element of the APD array to reduce response nonuniformity among the elements of the APD array.

27. The method according to claim 26, wherein the nonuniformity correction of the reverse bias voltages applied across each element of the APD array are found by selecting from the plurality of bias conditions tested, V2, V3, the bias conditions for each element resulting in total current closest to some specified value.

28. The method according to claim 27, wherein total current measurements at a plurality of APD bias conditions and reverse bias voltage adjustments are performed iteratively to equalize total current among the elements of the APD array, selecting APD bias conditions in successive iterations based on the current measurements of the previous iteration.

29. A system, comprising:
a sensor having an avalanche photodiode (APD) array and an integrated circuit having a bias control module and a passive/active mode module, wherein the sensor is configured to:
measure currents from the APD array;
individually control reverse bias voltages applied across each element in the APD array to reduce response nonuniformity among the elements of the APD array; and
select a nonuniformity bias correction for each element based on the measured currents from the APD array.

* * * * *